Jan. 3, 1933.  W. C. CORYELL  1,892,933
ROLLING MILL
Filed Oct. 1, 1928   8 Sheets-Sheet 1

Inventor:
William C. Coryell
By Thomas H. Ferguson
Atty.

Jan. 3, 1933. W. C. CORYELL 1,892,933
ROLLING MILL
Filed Oct. 1, 1928 8 Sheets-Sheet 3

Inventor:
William C. Coryell
By Thomas H. Ferguson
Atty.

Jan. 3, 1933.  W. C. CORYELL  1,892,933
ROLLING MILL
Filed Oct. 1, 1928  8 Sheets-Sheet 6
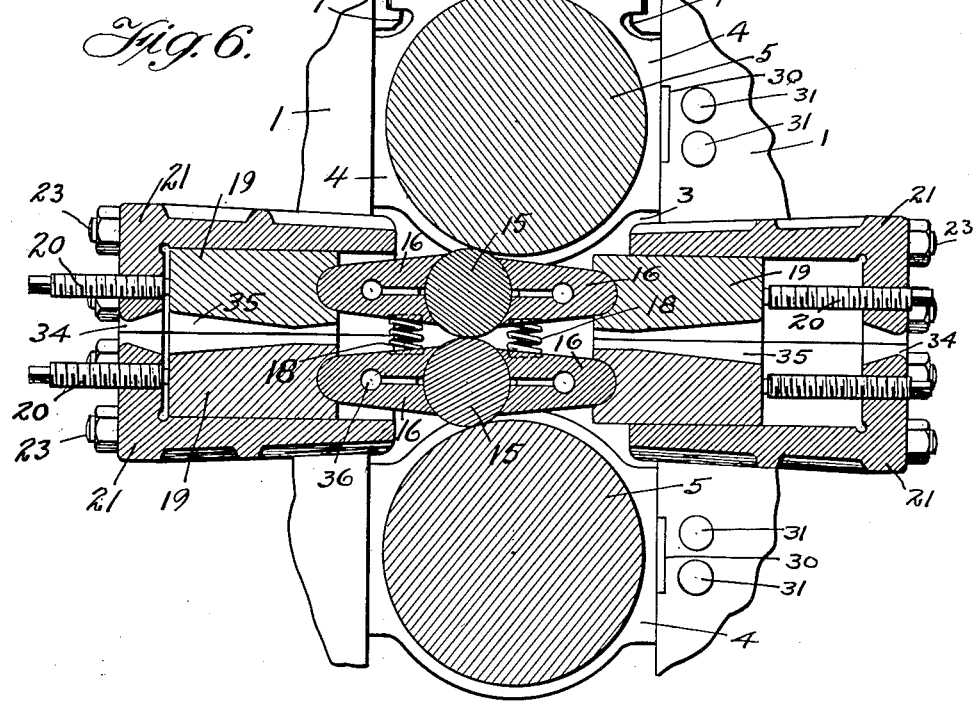
Fig. 6.
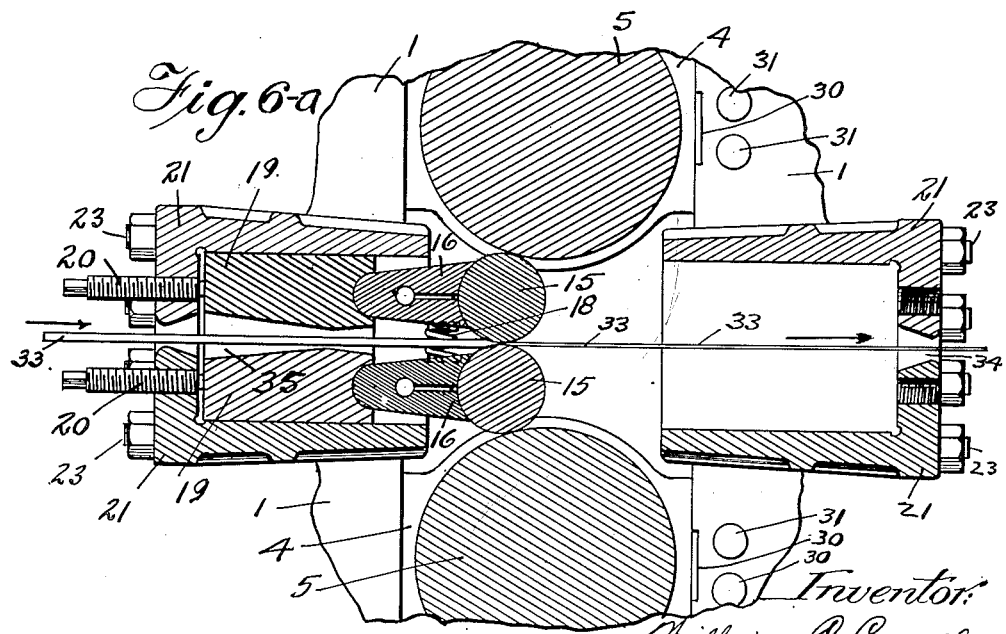
Fig. 6-a.
Inventor:
William C. Coryell
By Thomas H. Ferguson
Atty.

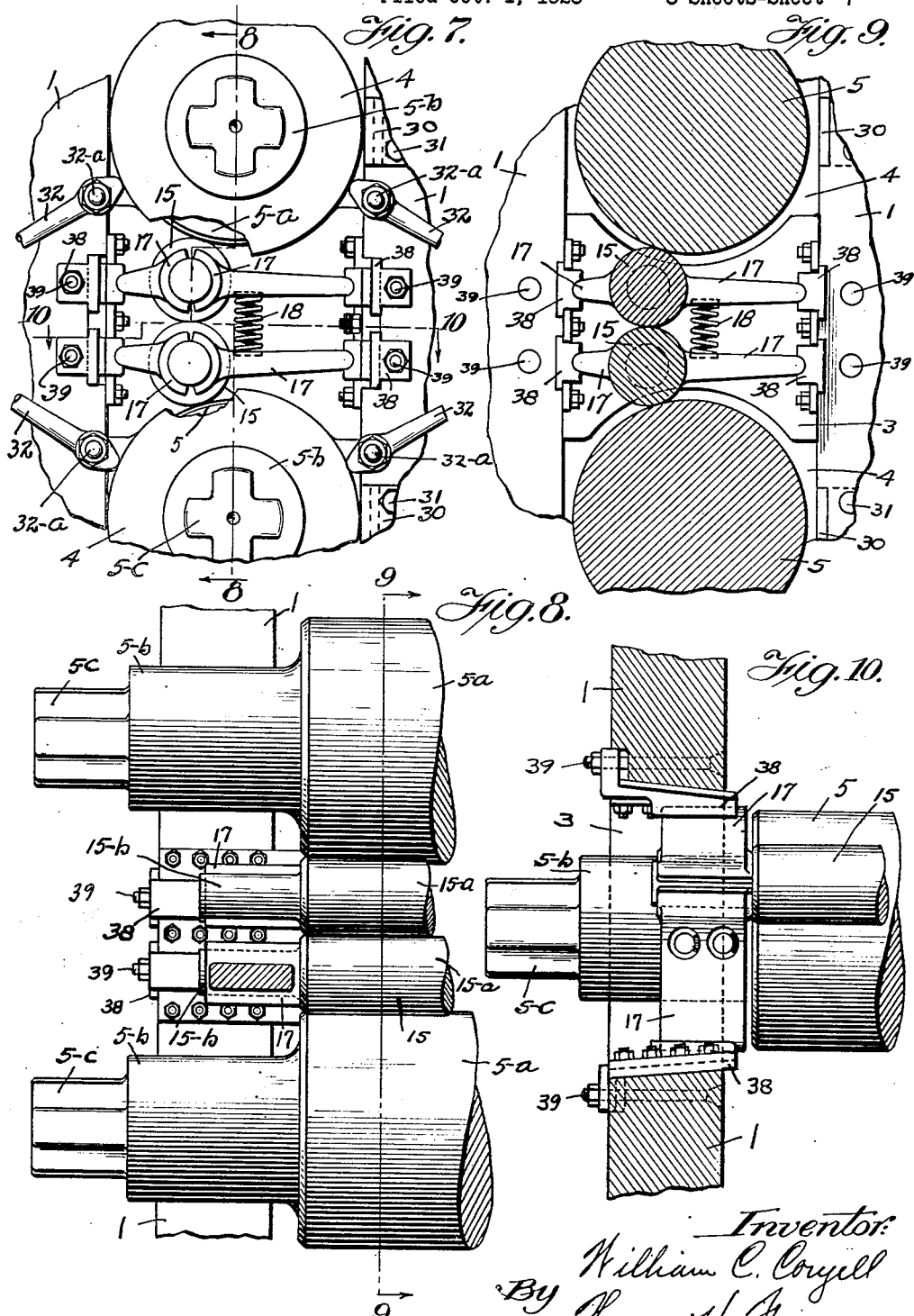

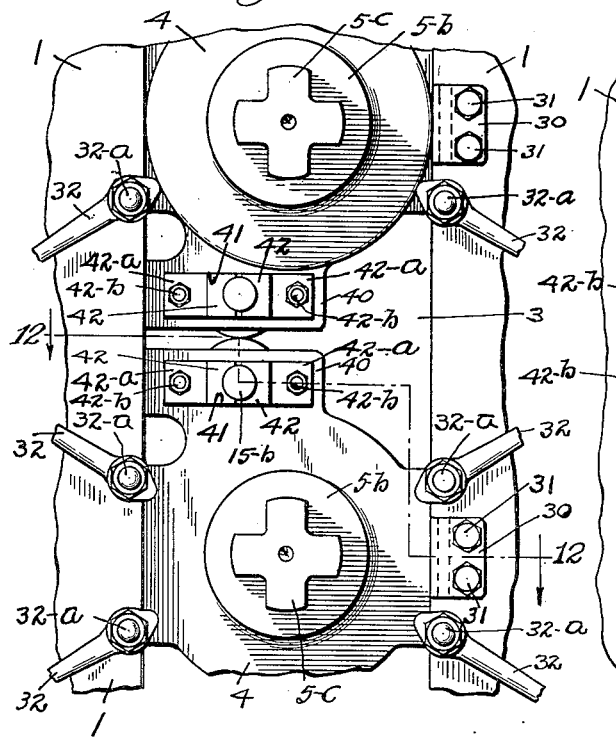
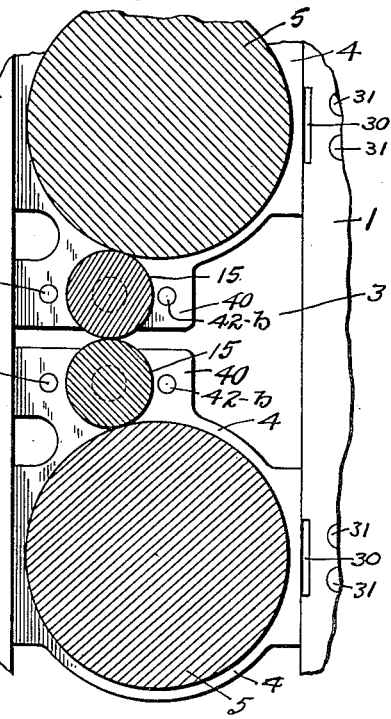
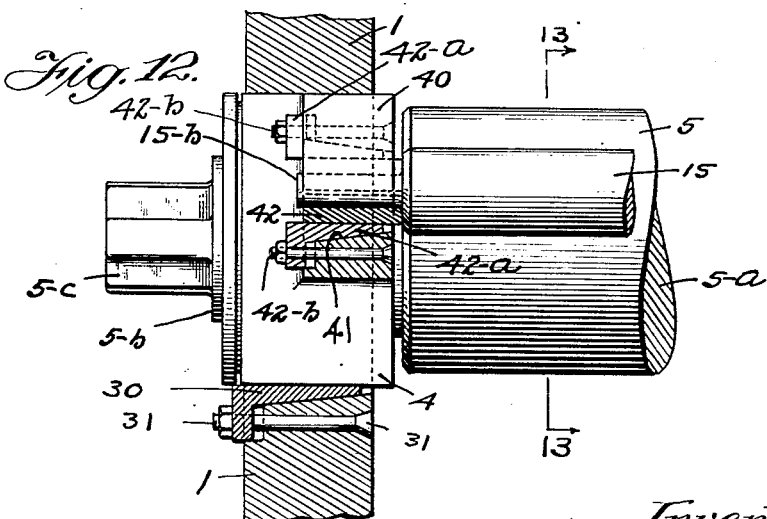

Patented Jan. 3, 1933

1,892,933

UNITED STATES PATENT OFFICE

WILLIAM C. CORYELL, OF YOUNGSTOWN, OHIO, ASSIGNOR, BY MESNE ASSIGNMENTS, TO REPUBLIC STEEL CORPORATION, OF YOUNGSTOWN, OHIO, A CORPORATION OF NEW JERSEY

ROLLING MILL

Application filed October 1, 1928. Serial No. 309,531.

This invention relates to rolling mills and more particularly to mills of the 4-high type. Still more particularly it is mainly directed to mills in which high tension is applied to the outgoing material, in conjunction with the usual compression of the rolls on the piece.

The particular feature of this mill is the offsetting of the working rolls towards the incoming side of the backing-up rolls so as to offer a rolling lateral support to the rolling rolls, the support being adjustable laterally.

In the annexed figures:

Fig. 6 is a vertical longitudinal section through the rolls, similar to Figure 3, except the working rolls are offset towards the entering material.

Fig. 6a is a section similar to Fig. 6, showing the working rolls supported laterally on one side only.

Fig. 7 shows a modified form of bearings and working rolls, both being offset towards the entering side of the mill.

Fig. 8 shows a vertical transverse section of the modified form of Figure 7, taken along the central line 8—8 of Figure 7, the main bearings being omitted.

Fig. 9 shows a vertical longitudinal section through the offset working rolls and the modified working roll bearings of Figure 8, taken at 9—9 in Figure 8.

Fig. 10 represents a plan view in section of the modified form taken at 10—10 on Figure 7.

Fig. 11 shows another modification of the bearings for the offset working rolls, the view being taken from the side.

Fig. 12 represents a sectional plan view of the modification of Figure 11, the section being taken at 12—12 on Figure 11.

Fig. 13 represents a vertical longitudinal section taken across the rolls at 13—13 on Figure 12.

Figure 1:
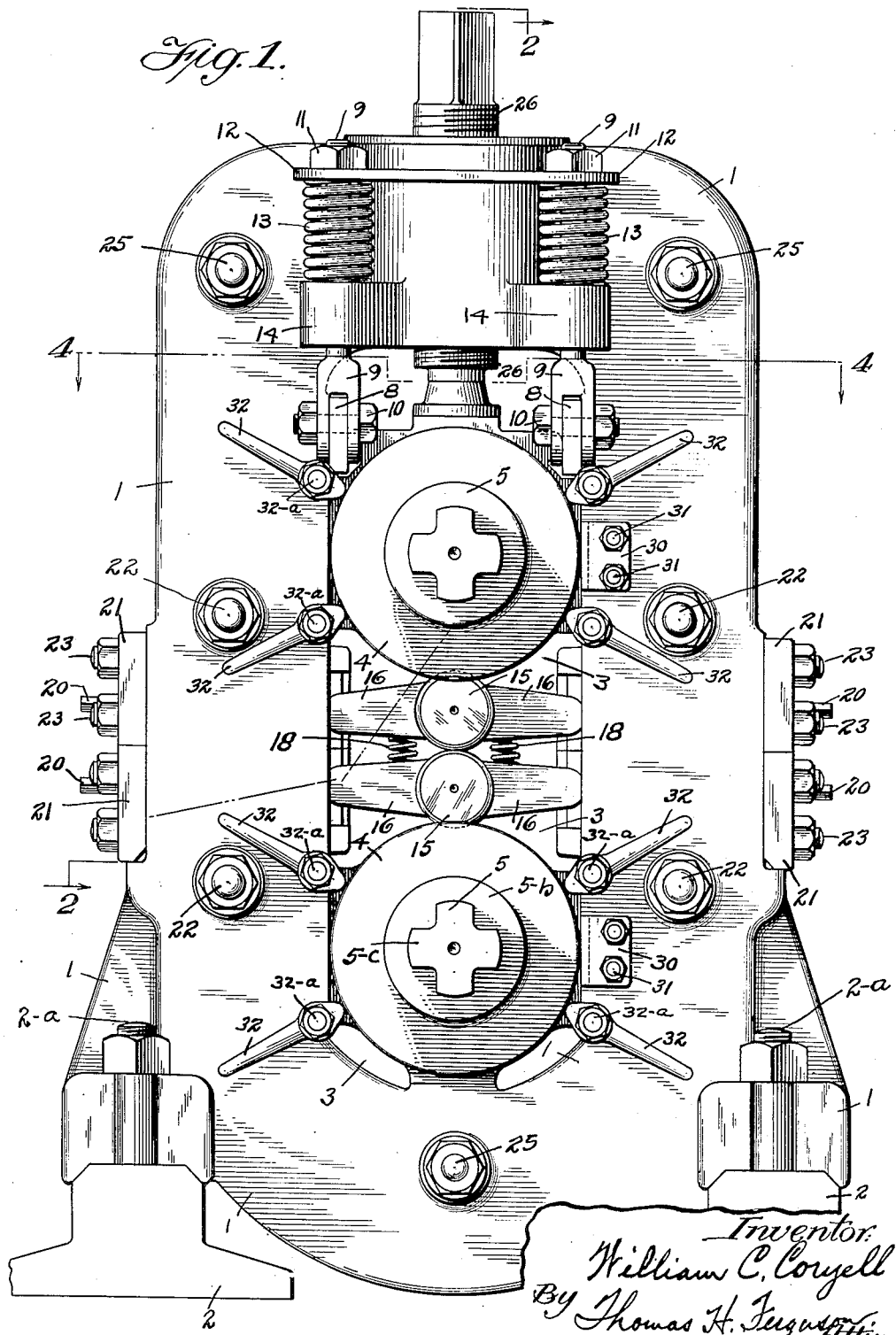
Fig. 1 represents a side elevation of my mill with working rolls in the mid-position supported by lateral adjustable bearings.
Figure 2:
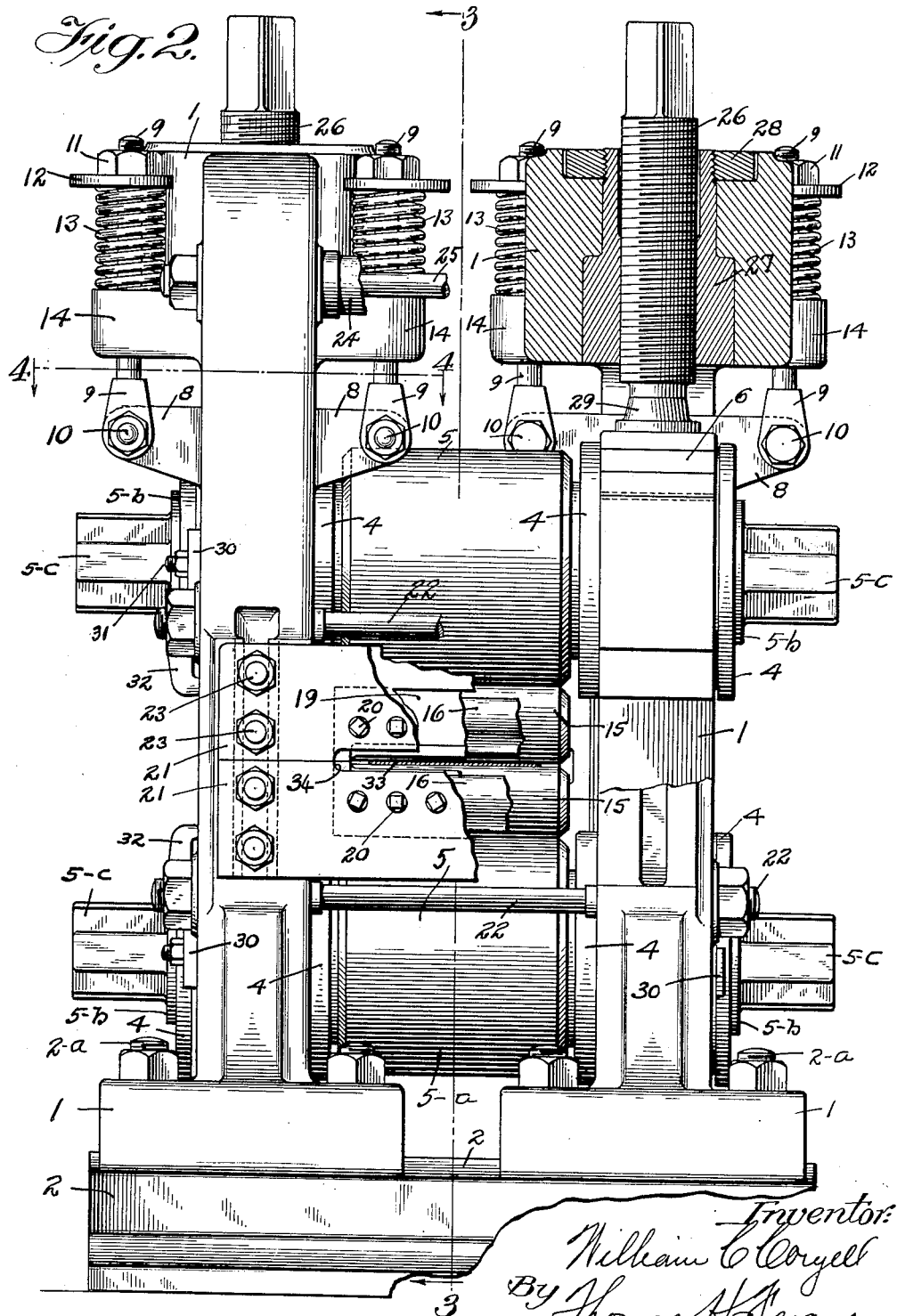
Fig. 2 shows a front view of my mill, with a portion of the right side cut away, as shown at 2—2 in Figure 1.
Figure 3:
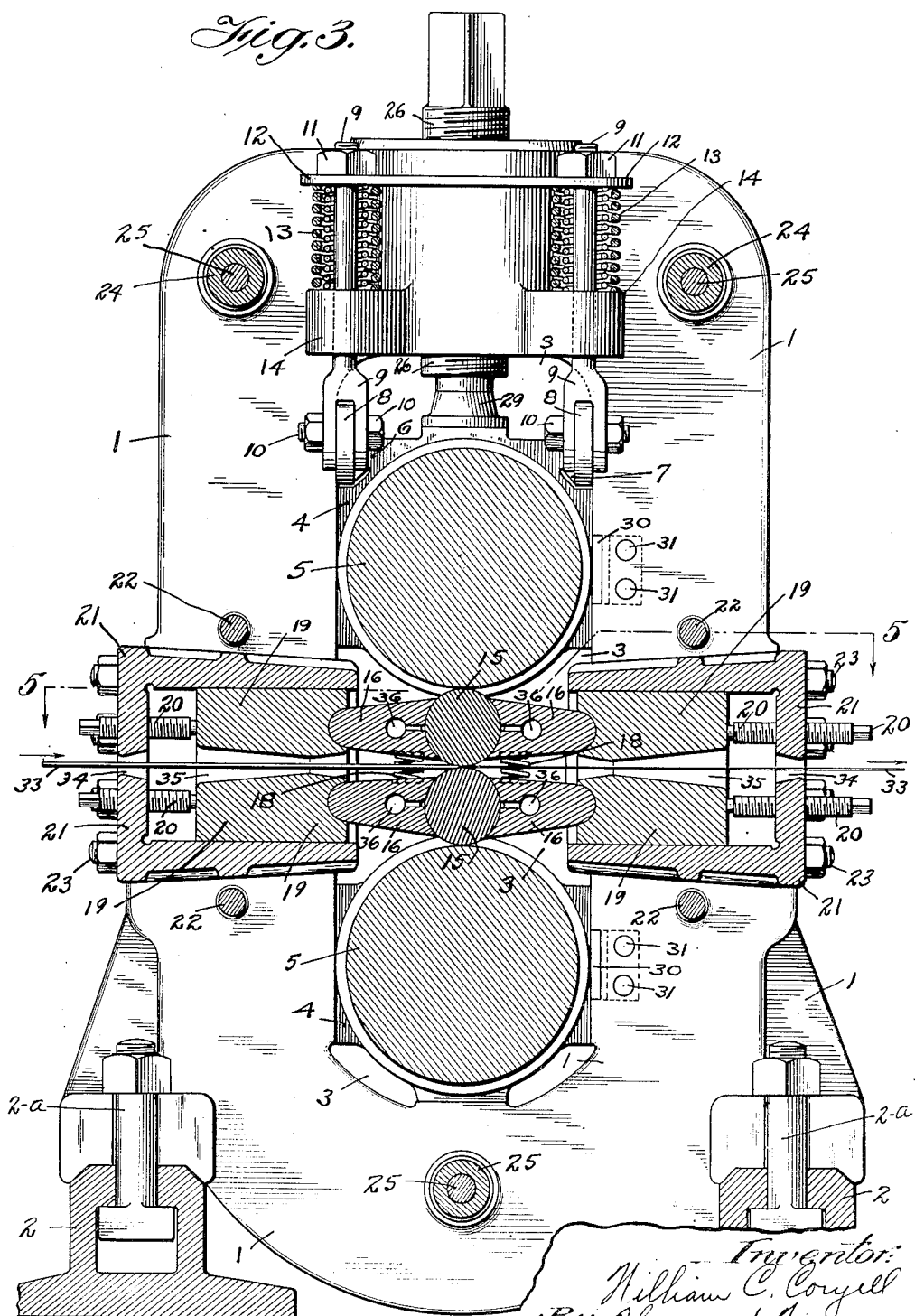
Fig. 3 shows a section along a longitudinal plane to show the working rolls and their adjustable side bearings. The section is taken at 3—3, shown in Figure 2.
Figure 4:
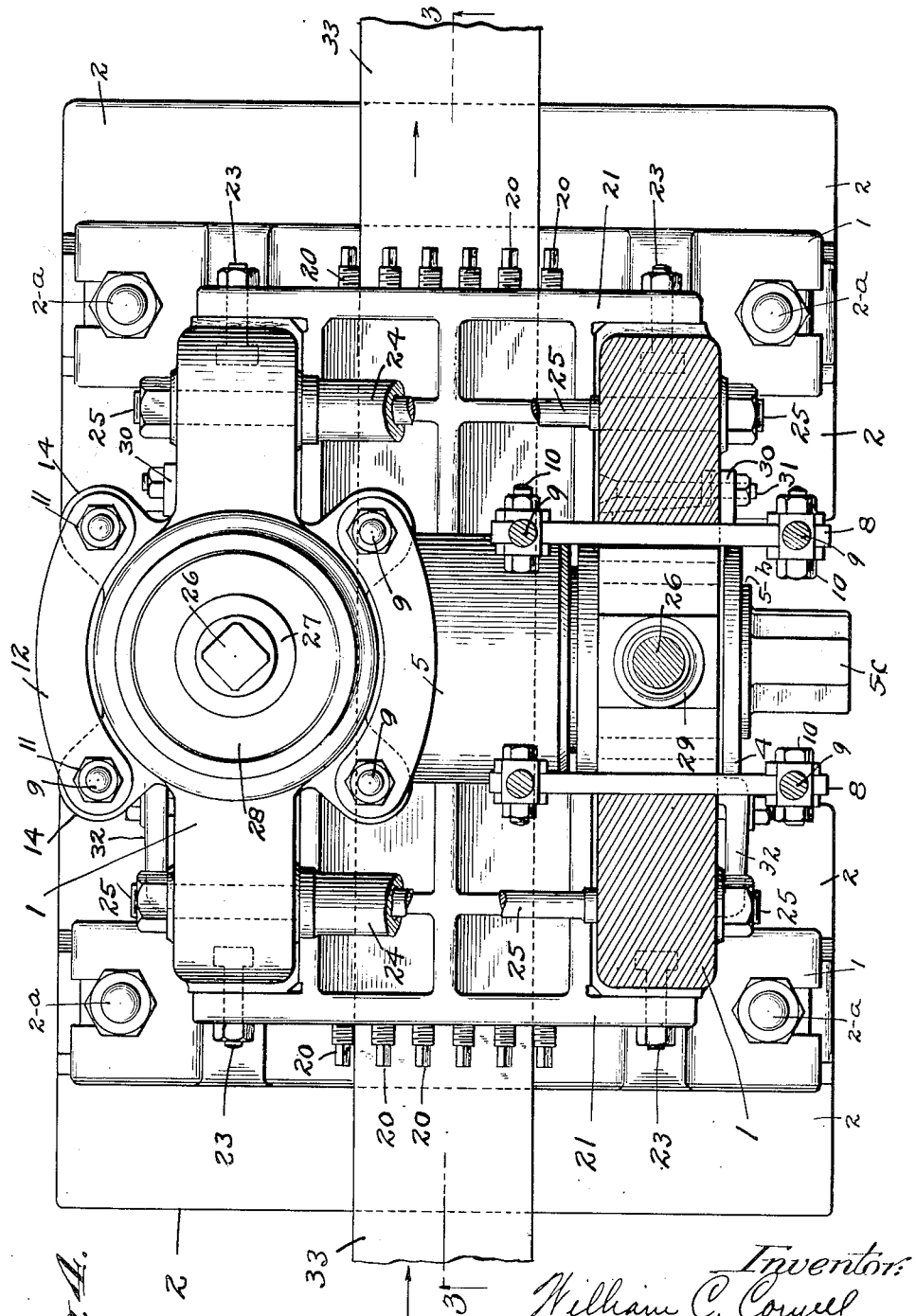
Fig. 4 shows a plan view of my mill, a half being cut away along line 4—4 of Figure 1 to show the counterbalance arrangement.

In referring to the details of the above figures, the same reference numbers refer to like parts throughout all the figures. Referring to the drawings in detail, 1 designates the mill housing mounted on shoes 2, attached by bolts 2—a, and the shoes may be attached to a suitable foundation. Each housing contains a window 3, which holds and retains the main roll bearings or boxes 4. The main backing up rolls 5 are carried in boxes 4 and are thus restrained to a predetermined relation one with the other.

The upper roll 5 and its boxes 4 are suspended by a spring counterbalancing device, consisting of several parts. Of these, 6 designates projecting lugs at the top of the top box 4 adapted to receive the hooks 7, which are located on one side of the lower edge of the equalizer bars 8. The equalizing bars 8 are each suspended from the ends by suspension bolts 9, the attachment being by bolts 10 or other means. The suspension bolts 10 are each carried by means of nuts 11 and washers 12, by compression springs 13. Large lugs 14 are located on the sides of the housings 1, above the windows 3, so that four lugs 14 on one housing are adapted for carrying one end of the two equalizer bars 8, which in turn carry one top bearing 4. Two housings usually stand on one pair of shoes. This permits of supporting the two boxes in firm alignment, one at either end of the roll 5. This roll is shown in better detail in Fig. 8 where the roll body 5—a is shown broken and one neck 5—b is shown without the box 4. The wabbler 5—c is shown, as it is a common practice to provide a wabbler on both ends of a roll, even when it is previously assumed that the same is not to be used.

In 4-high mills of my design the backing up rolls 5 are spaced somewhat apart to provide for the introduction of a set of smaller rolls 15 for rolling. These being the working rolls, they have to be held securely to a correct or exact alignment. This is done by adjustable bearings 16 on either side of the rolling surface of roll 15 or by adjustable bearings 17 on either side of the working roll necks 15—b. The roll body 15—a is between the pair of necks 15—b.

In this case the upper rolling roll 15 and the upper working roll bearings 16 are carried by springs 18. Other carrying means will readily suggest themselves to those who are skilled in the designing of rolling mills.

The working rolls 15 are carried laterally as before stated by adjustable bearings 16, which in turn are carried by adjusting blocks 19 and more distantly by adjusting screws 20. The adjusting screws are mounted in sets through threaded holes in the bearing boxes 21. These boxes are machined within so as to present exact guiding surfaces to the adjusting blocks, and are also machined at the ends adjacent to the housings so that they also act as separators between the two housings. In this relation they resist by internal compression, the tension of the tie bolts 22. The boxes, separators 21, as they may also be called, are supported by and attached to the housings by tap-bolts 23.

Other separators for determining the spacing of the housings with respect to each other are shown at 24; and they co-operate with tie-bolts 25.

The main bearings 4 are held with additional security, and adjusted if need be by a screw-down screw 26. This operates within a nut 27 which is rigidly held within a top opening of the housing. A locking nut 28 is usually provided within a recess in the housing to doubly insure the screw-down nut 27 from turning with the screw 26. The screw 26 is turned very slowly but with great force if need be, when adjusting the roll. To safeguard the machinery and to prevent great loss of time which might result from breaking the mill, a simple shell of a casting called a breaker 29 is usually located between the screw and the main bearing. Such a casting is easily and promptly replaced.

The main boxes 4 are held securely in the longitudinal direction of the mill by wedges 30. The wedges bear with one side flat against the flat surface of the box, while an opposite surface of the wedge is angular to the first side and it rests flat against an oblique surface in the side of the window 3, in the housing. An adjusting screw or a pair of screws 31 provide for a fine adjustment of the wedge. The opposite face of the window of the housing is usually left plain, without an adjusting wedge, as that side constitutes a plane of reference for aligning all the parts of the mill.

No mechanism is disclosed for adjusting the main screw-down screws. In is understood, however, that the force required to adjust the screws may be very great and should be used with much nicety. This is being done by any one of several types of screw-downs. One type is shown in my application Serial Number 49,983, filed August 13th, 1925.

Again the main bearings are held in a transverse direction, that is in a direction corresponding to the lengthwise direction of the rolls, by clamps 32, four for each bearing, the clamps in turn being held by adjusting bolts 32—a. The clamps and bolts are arranged on the outside surfaces of the two housings, so that one set of adjusting clamps acts through the assembly of the housings and the separator castings 21 and 24, and the separator bolts 22 and 25, in opposition to the other set of adjusting clamps.

The boxes 4 enclosing the roll necks 5—b, are adapted to bear against the roll body 5—a, and thus secure the roll against a longitudinal movement.

It will thus be seen that the mill is adapted to roll a thin strip, 33 in this case. The strip is given a free passageway through opening 34 in the box-separator 21 and through passageway 35 between the adjusting blocks 19, and between the two bearings 16, finally to be caught and rolled between the relatively small diameter working rolls 15. Here it is reduced in thickness by the great pressure of the rolls and passes out through the passage-ways 35 and 34 to the pulling device, which in this case actuates the mill.

As illustrative of a pulling device which may be used with my mill, see my Patent No. 1,238,002, granted October 21, 1917. This patent shows one design of pulling device. Any other suitable mechanism for this purpose will do.

Figure 5:
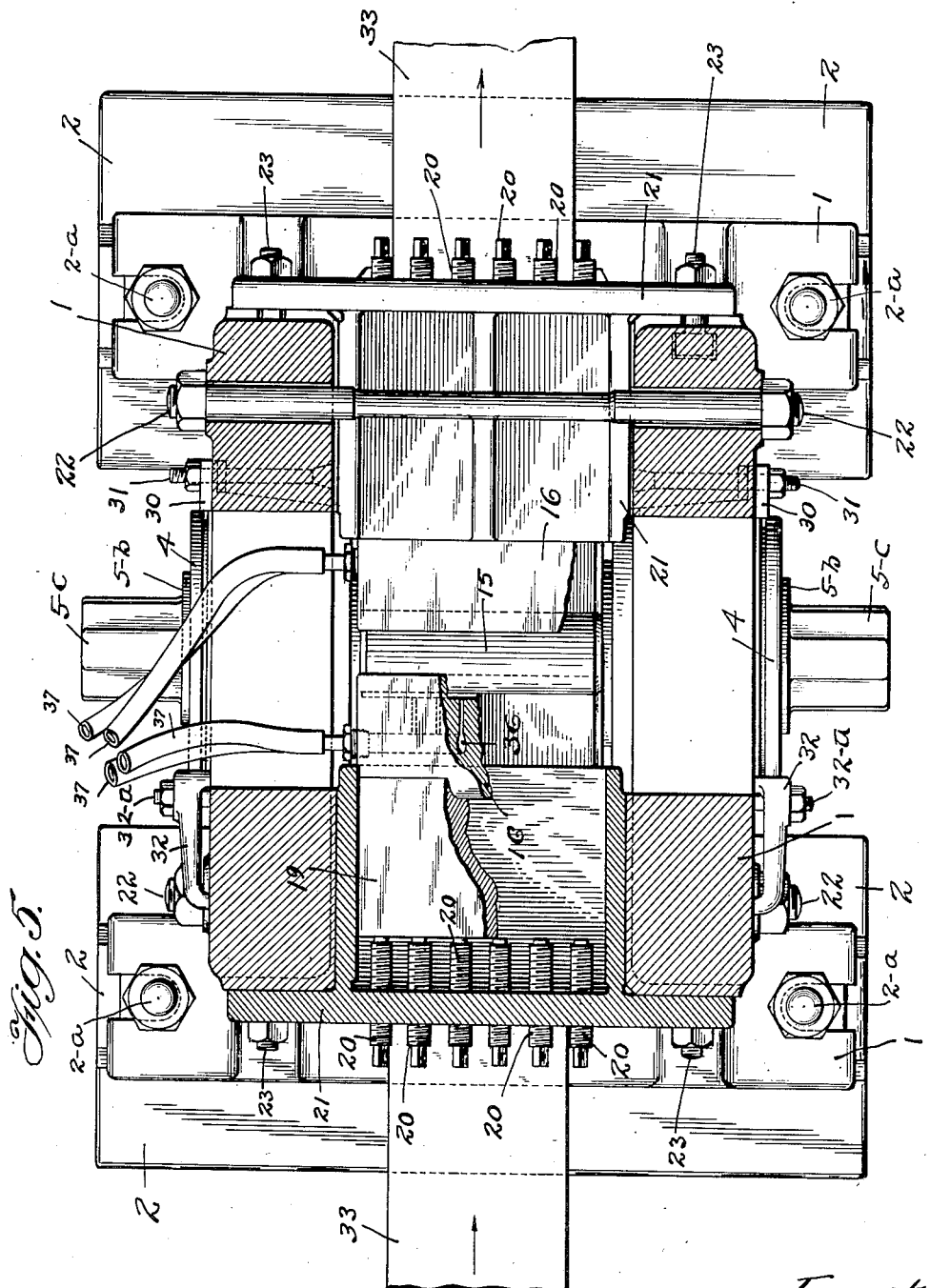
Fig. 5 is a plan view in section taken at 5—5 on Figure 3.

Lubricating or cooling devices may be used in connection with the side bearing 16, or otherwise, and means of heating the rolls with a flame or use of other heating means may be used, as is now commonly done in the accurate cold rolling of thin material. The cooling or heating means may be applied also from within the side bearings or from within the roll itself or exteriorly. One application is shown in openings 36 in the side bearings which are supplied with heating fluid, or lubricant, by hose 37, as shown in Fig. 5.

The working rolls 15 may be held in three directions as are the backing up rolls. The amount of offset may be approximately established by making unequal legs on the bearings 17. When in working position, wedges 38 admit of as fine adjustment as may be needed. These wedges rest against an oblique surface cut in the face of the housing window and carry in a transverse cylindrical recess, the rounded end of the bearing 17. An adjusting screw 39 enables the wedge to be moved along its inclined seat. It, of course, is recognized that an adjustment of the roll neck 15—b is accomplished by loosening the adjusting bolt 39 on one side of the neck and by tightening the adjusting bolt 39 on the opposite side of the neck. Or, if the roll is of the type shown in Fig. 1, the adjustable side bearing 16 is receded in the direction the roll is to be moved, by adjusting the screws 20, in an outward direction, then the opposite screws 20 are tightened to accomplish the adjustment of the working roll.

In case the working rolls are out of adjustment, or alignment, a roller who is skilled in adjusting mills will be able to carry out even more complex adjustments of the rolls. This relates particularly to cases where there is a cross-roll relation or other ill-alignment.

In some cases, where the resultant of the forces are known to be acting always in one direction, it may not be necessary to use both sets of adjustable bearings. Only the set will be used which comes into effective action, as is illustrated in Fig. 6—a.

A modified means for carrying the working rolls is illustrated in Figs. 11, 12, and 13. Here the main bearings 4 are provided with lugs 40. Suitable openings 41 through these lugs admit of bearings 42 to be introduced to support necks 15—b. These bearings are adjusted by a pair of wedges which slide against inclined surfaces at the ends of the openings 41. By means of adjusting screws 42—a, the wedges consequently the boxes and with them the necks can be adjusted as in the case of the other roll adjustments.

If the small rolls require adjustment longitudinally to their length, it can be provided as heretofore indicated by small clamps and adjusting screws attached to the main boxes. In this case, they would be made quite similar to clamps 31 and adjusting bolts 32, only they may be made much smaller.

In 4-high mills several advantages are found in having offset rolls and in having adjustable bearings for regulating the amount of offset as well as for carefully aligning the rolls, and for opening or closing the pass.

When the working rolls are positioned at or immediately adjacent the vertical center lines of the backing up rolls, the high tension which is applied to the outgoing piece is carried to the two working rolls. But a small diameter makes them unsuitable for withstanding a high lateral stress. They, therefore, may be deflected out of their true position, which deflection introduces rolling difficulties. To belly the working rolls at the center does not suffice in this case because the widths and the reductions are not constant from day to day. I, therefore, have found in using small diameter working rolls that a great advantage is derived from the lateral support that is obtained when the working rolls 15 are offset on the side of the backing up rolls on the side of, or towards the incoming material. I further find that the greater the tension the greater is the amount of offsetting that is necessary to relieve the roll deflection.

When viewed from the standpoint of lateral bearings on the face of the rolls, I find it advantageous to reduce to a minimum the lateral pressure on the working rolls, due to the tension on the piece.

Now the oblique reaction of the backing up rolls is partly opposed to the tension which is applied to the material being worked upon. The greater the tension, the more necessary it is to interpose an opposing stress so as to avoid a deflection of the working rolls, and hence, the greater advantage is obtained in increasing the offset. It is possible, therefore, with my adjustable bearing means to balance the two at least within the limits required for good rolling.

As a matter of practice, I usually more than balance the tension. I, therefore, in that case give more offset to the working rolls than is enough to balance the applied tension. In other words, there is a small reaction on the working rolls coming from the backing up rolls, which is not entirely balanced by the tension which is applied to the piece.

It depends upon the sections being rolled as to how much offset or how much excess offset is made. With no excess offset the lateral bearing pressure of the working rolls against their bearings is practically a minimum, as the reaction of the backing up rolls is just balanced by the tension. It is an advantage, in avoiding working roll deflection, to make use of low bearing pressures on the slender working roll necks. The amount of offset in that case is not allowed to become excessive. In case looseness exists between the working rolls and their side bearings, an exact balancing of the reaction of the main rolls, and the tension may cause the rolls to chatter. This is to be avoided.

The amount of bearing pressure against the face or body of the roll is somewhat secondary, however, since the main factor to be obtained is the non-deflection of the working rolls. Bearing pressure can be met by controlling hardness, but deflection is dependent upon elasticity of the rolls, which is not controllable.

Having attained freedom from excessive lateral bearing pressure of the working rolls, and consequently freedom from deflection, I am enabled to lessen the diameter of the working rolls. This in turn lessens the offset required. It, therefore, follows that I am enabled to gain a great advantage in having comparatively small diameter working rolls and rolls that are stiffer than have heretofore been used, due to better supporting of the working rolls.

The smaller diameter working roll, of course, must itself withstand some lateral stresses, and its bearings, whether neck bearings or body bearings must be ample to securely hold the rolls in their respective positions.

The amount of reduction and the amount of tension having been determined upon, it becomes possible theoretically to determine upon the approximate amount of offset. The mill is then set for that condition with the piece in the mill and in the pulling machine (my application Serial Number 280,681, filed May 26th, 1928). Provision is also made for welding pieces together in front of the mill, so that a continuous strip or piece may be fed to the mill, as is provided for in my application, Serial Number 282,653, filed June 4th, 1928. Usually, I do not find it necessary to drive the rolls, since I depend upon the pulling machine for advancing the piece. The modern roller bearings have been in use on roll necks for many years and they have been found to greatly reduce the heating of the rolls, as well as the friction load of the mill. With them on the mill, the tractive power of the pulling machine is, therefore, largely expended upon the useful work of rolling.

It may be pointed out that many other modifications besides the ones disclosed may be made in this mill and in the details, and still make use of offset working rolls and offset bearings for adjusting the working rolls. While 1 prefer the type of rolling which makes use of my high tension method of rolling, as illustrated in my Patent 1,618,515, I do not wish to restrict myself to that method of rolling only.

What I claim as new and desire to secure by Letters Patent of the United States is:

1. In a 4-high mill with comparatively small diameter working rolls and comparatively large diameter backing-up rolls, two part adjustable side bearings for contacting against said working rolls and supporting the same laterally, one part movable only horizontally and the other part bearing against a cylindrical portion of the working roll and having rocking engagement with the first part, and compression springs acting between the roll-engaging parts of said bearings tending to move said parts and the cooperating working rolls apart.

2. In a 4-high mill with relatively small diameter working rolls and relatively large diameter backing-up rolls, side bearing members contacting against the sides of the rolling surfaces of said working rolls, horizontally adjustable blocks against the inner ends of which the outer ends of said members pivotally engage, and spring between said members tending to separate them.

3. In a 4-high mill with relatively small diameter main working rolls and relatively large diameter backing-up rolls, adjustable bearings for said working rolls, the same being positioned in a plane offset in the direction of travel of the work from a plane through the axes of the main backing-up rolls, said bearings comprising in each instance two members mounted for limited vertical pivotal movement relative to each other, means for moving said members as a whole inward toward said rolls, and spring means operative when free to separate the inner members of the respective bearings.

4. In a 4-high mill with relatively small diameter working rolls and relatively large diameter backing-up rolls, side bearings contacting with and supporting one side of the rolling surface, the side bearing being provided with vertical and horizontal adjustments.

5. In a 4-high mill with relatively small diameter working rolls and relatively large diameter backing-up rolls, vertically rockable side bearing members offering support against a deflection of the rolling surface by direct engagement with said surface, bearing blocks behind said bearing members tending to hold them in place, screw means for adjusting said blocks toward said working rolls, and means acting between said bearing members tending to yieldingly hold the same apart.

6. In a 4-high mill with relatively small diameter working rolls and relatively large diameter backing-up rolls, side bearing members contacting against the side of the rolling surfaces of said working rolls and positioned to one side of a plane through the axes of the backing-up rolls, horizontally adjustable means outward of said bearing members for pressing said members against said rolling surfaces, and means for yieldingly holding said bearing members apart.

7. In a 4-high mill with relatively small diameter working rolls and relatively large diameter backing-up rolls, side bearings for said working rolls, said bearings contacting with and supporting one side of the rolling surface and positioned to one side of a plane through the axes of said backing-up rolls, the side bearings being provided with vertical and horizontal adjustments.

8. In a 4-high mill with relatively small diameter working rolls and relatively large diameter backing-up rolls, adjustable bearings having inner and outer parts, the inner parts having curved faces for bearing against the curved surfaces of the working rolls, said bearings being to one side of a plane through the axes of said backing-up rolls and each bearing having its parts relatively movable one with respect to the other vertically, means for moving said bearings toward and from the plane of said backing-up rolls, and means for moving said backing-up rolls vertically relative to each other.

9. In a mill having backed-up working rolls, two-part adjustable side bearings for said rolls contacting against their rolling surfaces and supporting said rolls laterally, one part of each bearing being movable only horizontally and the other part bearing against a cylindrical portion of the associated roll and having rocking engagement with the first part, and compression springs acting between the roll-engaging parts of said bearings tending to move said parts and the cooperating working rolls apart.

10. In a mill having working rolls and backing-up rolls, all said rolls being disposed symmetrically with reference to a central vertical plane, adjustable bearings for said working rolls, the same being positioned in a plane offset from and parallel to said vertical plane, said offset being in the direction of the path of the strip, said bearings comprising in each instance two members mounted for limited vertical pivotal movement relative to each other, means for moving said members as a whole inward toward said rolls, and spring means operative when free to separate the inner members of the respective bearings.

11. In a mill having backed-up working rolls, vertically rockable side bearing members offering support against a deflection of the rolling surface by direct engagement with said surface, bearing blocks behind said bearing members tending to hold them in place, screw means for adjusting said blocks toward said working rolls, and means acting between said bearing members tending to yieldingly hold the same apart.

12. In a mill having vertically adjustable backed-up working rolls, adjustable side bearings for said rolls each having an inner part and an outer part, each inner part having an inner concave bearing surface for engaging a cylindrical surface of the associated roll and the outer end of each inner part engaging the inner end of the associated outer part with concavo convex bearing surfaces, whereby said inner part may be rocked vertically about its concavo convex bearing, and means for individually adjusting said outer parts horizontally toward and from said rolls.

13. In a mill having vertically adjustable backed-up working rolls, upper and lower side bearings for said rolls at each end of said rolls, each bearing having an inner part and an outer part, each inner part having an inner concave surface for bearing upon a cylindrical surface of the associated roll and shaped at its outer end to bear upon the inner end of the associated outer part, the inner and outer parts being provided with engaging concavo convex bearing surfaces, whereby the inner part may be rocked vertically with reference to its outer part, springs between associated upper and lower inner parts tending to force them apart vertically, and means for adjusting said outer parts horizontally toward and from said rolls.

14. In a mill having backed-up working rolls, side bearing members for said rolls contacting with rolling surfaces of the same, blocks for backing-up said members, means for adjusting said blocks toward said rolls to press said members against said rolls, and compression springs between said members to allow for vertical adjustment of the same in response to vertical movements of said rolls.

In witness whereof, I hereunto subscribe my name this 27th day of Sept. A. D., 1928.

WILLIAM C. CORYELL.